US010387847B2

(12) United States Patent
Pinard et al.

(10) Patent No.: US 10,387,847 B2
(45) Date of Patent: Aug. 20, 2019

(54) METHODS AND SYSTEMS OF MANAGING INDIVIDUALS

(71) Applicant: INITLIVE INC., Ottawa (CA)

(72) Inventors: Deborah Pinard, Dunrobin (CA); Melissa Pinard, Dunrobin (CA); Scott Bamford, Ottawa (CA)

(73) Assignee: Initlive Inc., Ottawa, Ontario (CA)

( * ) Notice: Subject to any disclaimer, the term of this patent is extended or adjusted under 35 U.S.C. 154(b) by 450 days.

(21) Appl. No.: 15/007,398

(22) Filed: Jan. 27, 2016

(65) Prior Publication Data

US 2016/0217431 A1 Jul. 28, 2016

Related U.S. Application Data

(60) Provisional application No. 62/108,232, filed on Jan. 27, 2015.

(51) Int. Cl.
*G06Q 10/00* (2012.01)
*G06Q 10/10* (2012.01)

(52) U.S. Cl.
CPC ..... *G06Q 10/1095* (2013.01); *G06Q 10/1097* (2013.01)

(58) Field of Classification Search
CPC ........................ G06Q 10/1095; G06Q 10/1097
See application file for complete search history.

(56) References Cited

U.S. PATENT DOCUMENTS

| | | | | |
|---|---|---|---|---|
| 2002/0116242 A1* | 8/2002 | Vercellone | ............. | G06Q 10/06 705/7.13 |
| 2006/0265489 A1* | 11/2006 | Moore | ................ | H04L 67/1095 709/223 |
| 2007/0043585 A1* | 2/2007 | Matos | .................... | G06Q 50/22 705/2 |
| 2008/0059268 A1* | 3/2008 | Davantes | ....... | G06Q 10/063112 705/7.14 |

(Continued)

OTHER PUBLICATIONS

An optimization model for humanitarian relief volunteer management M Falasca, CW Zobel, GM Fetter—Proceedings of the 6th . . . , 2009—researchgate.net.*

(Continued)

*Primary Examiner* — Jonathan G Sterrett
(74) *Attorney, Agent, or Firm* — Rosenberg, Klein & Lee

(57) ABSTRACT

Supervisors, managers, enterprises, organizers, etc. must ensure appropriate staffing by employees and/or volunteers to achieve their goals for each event, activity etc. at each location. However, unplanned absent individuals impact this ability and can absorb significant time and effort to overcome by re-allocating existing present individuals or seeking replacements at short or even no notice. Accordingly, each individual addressing this seeks the ability to establish communications to individuals or group of individuals rapidly, with low complexity and management overhead, knowing that those identified meet their requirements without searching/reviewing personnel profiles etc. Further, such individuals seek the ability to dynamically view and address problems within their domain of responsibility irrespective (Continued)

of where they are in relation to the event etc. Such issues can be addressed through the methods and systems according to the invention.

20 Claims, 8 Drawing Sheets

(56) References Cited

U.S. PATENT DOCUMENTS

| | | | |
|---|---|---|---|
| 2008/0065576 A1* | 3/2008 | Friedlander | G06N 7/08 706/47 |
| 2009/0284348 A1* | 11/2009 | Pfeffer | G08B 25/006 340/7.3 |
| 2011/0130636 A1* | 6/2011 | Daniel | G08B 25/016 600/301 |
| 2011/0145035 A1* | 6/2011 | Franke | G06Q 10/06 705/7.22 |
| 2012/0136923 A1* | 5/2012 | Grube | H04W 4/90 709/203 |
| 2013/0048720 A1* | 2/2013 | Lewis | G06Q 10/00 235/382 |

OTHER PUBLICATIONS

Sahana: Overview of a disaster management system M Careem, C De Silva, R De Silva . . . - . . . , 2006. ICIA 2006 . . . , 2006—ieeexplore.ieee.org.*

Sahana-Eden user manual, retrieved from web.archive.org (crawled on May 9, 2012) at http://web.archive.org/web/20120509003313/ http://en.flossmanuals.net/_booki/sahana-eden/sahana-eden.pdf.*

Open source software for disaster management P Currion, C Silva, B Van de Walle—Communications of the ACM, 2007—dl.acm. org.*

A next generation electronic triage to aid mass casualty emergency medical response T Gao, D White—Engineering in Medicine and Biology Society . . . , 2006—ieeexplore.ieee.org.*

Task-adaptive information distribution for dynamic collaborative emergency response N Netten, G Bruinsma, M Van Someren . . . - . . . International Journal of . . . , 2006—researchgate. net.*

Design principles for critical incident response systems R Chen, R Sharman, HR Rao, S Upadhyaya—Information Systems and E . . . , 2007—Springer.*

Emergency Systems for Advance Registration of Volunteer Health Professionals (ESAR-VHP) Program, Interim Technical and Policy Guidelines,Standards, and Definitions, U.S. Department of Health and Human Services Health Resources Services Administration, Version 2, Jun. 2005, pp. 1-159.*

* cited by examiner

METHODS AND SYSTEMS OF MANAGING INDIVIDUALS

CROSS-REFERENCE TO RELATED APPLICATIONS

This patent application claims the benefit of U.S. Provisional Patent Application 62/108,232 filed Jan. 27, 2015 entitled "Managing No Shows", the entire contents of which are included herein by reference.

FIELD OF THE INVENTION

This invention relates to the field of voice and data communications, and in particular to methods and systems for managing volunteers, employees and other individuals associated with a task, shift, or other activity within a planned event.

BACKGROUND OF THE INVENTION

There are a wide range of instances where a group of individuals are coordinated for an event. Examples of such events can include, but are not limited to, sporting events, convocations, festivals, concerts, business meetings, conferences, charity events, and reunions. Today, in order to set up such events a range of options exist with respect to communication tools including, for example, Simple Messaging Service (SMS), telephone, social media such as Facebook™ messaging services such as Twitter™, email, and web based services such as Google Events.

In the majority of instances these events are based at a particular location (e.g. an office, arena, course, etc.) although in other instances these may be a range of locations (e.g. a charity run requiring volunteers at the start, finish and runner registration) and whilst typically over a generally small geographic area the multiple locations may be over an extended geographic area (e.g. Rio de Janeiro for the Summer Olympics). Accordingly, the number of helpers, volunteers, attendees, support staff, event staff may range from a few to hundreds to thousands.

Within the prior art organizers of such events must factor into their planning missing individuals, commonly known as no-shows. Within the volunteer staffing environment an average of 30% of volunteers do not show up for their assigned shift(s). When this occurs, as indeed can occur within an enterprise with employees being absent, a manager (e.g. an event manager) or a supervisor (e.g. shift supervisor) must scramble to find replacements either for all of the missing individuals or sufficient to ensure execution of the minimum role set for that shift and/or event. Whilst within the prior art the volunteer or staff member may electronically communicate a planned absence to the supervisor/manager, which whilst providing at least a notification at least, does not reduce the requirements to find a replacement. This may be exacerbated by individuals swapping shifts without anyone other than themselves knowing, unforeseen events, and late changes in event logistics.

Accordingly, it would be beneficial to provide supervisors, managers, enterprises, organizers, etc. with the ability to establish communications to individuals or group of individuals rapidly, with low complexity and management overhead, exploiting a software application in execution upon the individual's mobile devices that are connected to wireless networks over varying geographical areas without requiring the supervisors, etc. to have any direct interaction of the individuals. Further, it would be beneficial for the knowledge of the distribution of walkie-talkies etc. as the mobile device is the user's own smartphone or cellphone. Further, it would be beneficial for the supervisors, managers, enterprises, organizers, etc. through the software application of delayed arrival of individual(s) or the incorrect location of individuals.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations within the prior art relating to the field of voice and data communications, and in particular to methods and systems for managing volunteers, employees and other individuals associated with a task, shift, or other activity within a planned event.

In accordance with an embodiment of the invention there are provided a method and a system allowing a user to manage individuals associated with at least one of a role, a location, a venue and a shift for an event and engage replacement individuals upon at least one of an anticipated failure and an actual failure to check in for the role, the location, the venue and the shift of the event.

In accordance with an embodiment of the invention there is provided a method comprising:
monitoring individuals assigned to an event and assigned at least one of a role, a location, a venue and a shift with respect to their being checked in to the event with respect to at least one of the location and the shift;
comparing the checked in individuals for the event and assigned at least one of the role, the location, the venue and the shift to verify whether a quota associated with the event for the at least one of the role, the location, and the shift has been met;
upon failure to verify providing to a user an indication of the status of the number of checked in individuals relative to the quota for the at least one of the role, the location, the venue and the shift.

In accordance with an embodiment of the invention there is provided a method comprising:
monitoring individuals assigned to an event, a shift relating to the event and at least one of a location and a venue relating to the event with respect to their being able to check in to the event at the location with a timing commensurate with the shift;
verifying the individuals established as being able to check in meet a quota associated with the event, the location, the venue and the shift;
upon failure to verify providing to a user an indication of the individuals established as being able to check in meet a quota associated with the event, the location, and the shift relative to the quota for the event, the location, the venue and the shift.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1A:
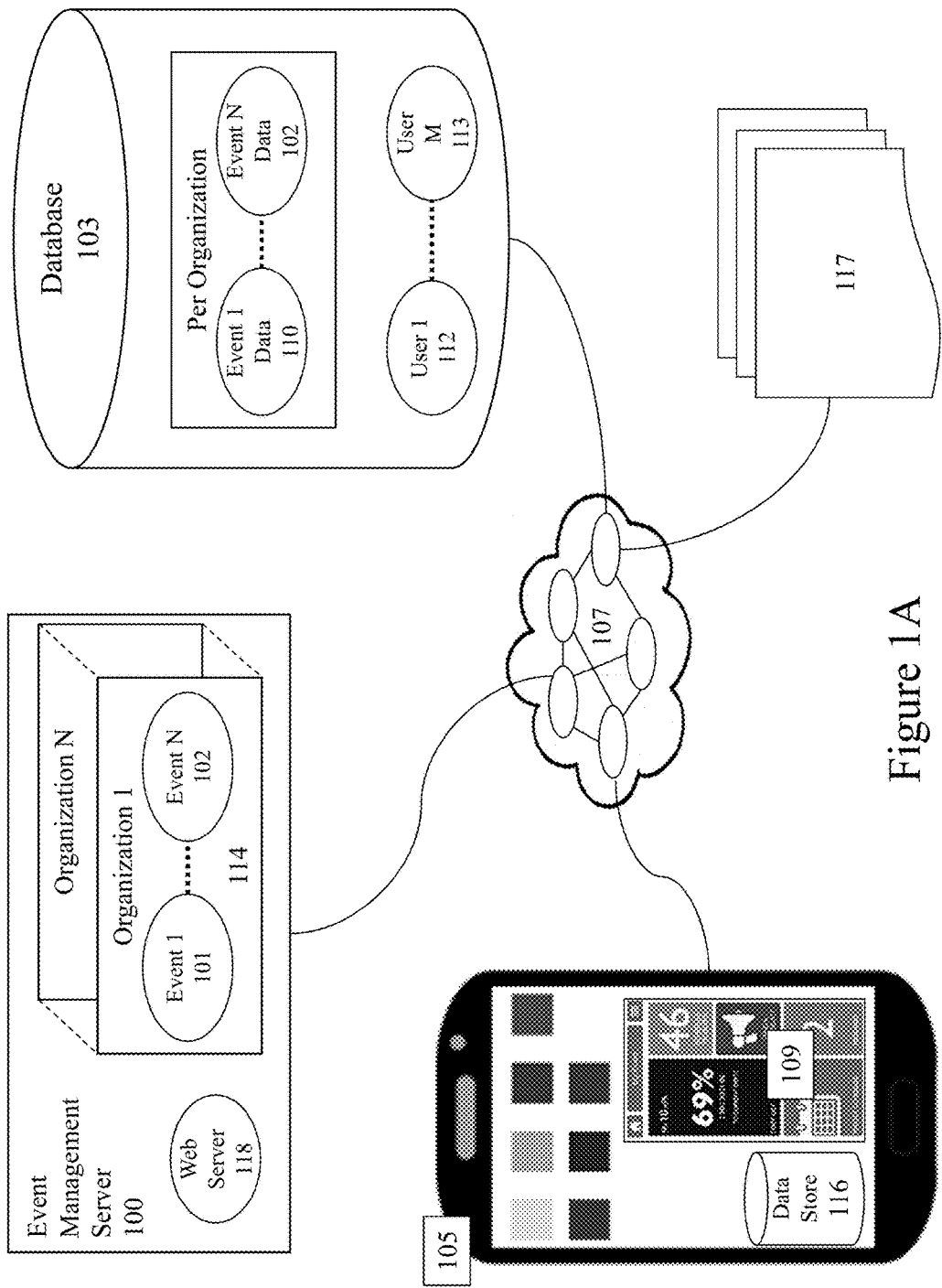
FIG. 1A depicts a network diagram of the system according to an embodiment of the invention.

The present invention is directed to the field of voice and data communications, and in particular to methods and systems for managing volunteers, employees and other individuals associated with a task, shift, or other activity within a planned event.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements and that the invention the invention is intended to cover all alternatives, modifications, and equivalent arrangements without departing from the scope which is as set forth and defined within the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and /or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "social network" or "social networking service" as used herein may refer to, but is not limited to, a platform to build social networks or social relations among people who may, for example, share interests, activities, backgrounds, or real-life connections. This includes, but is not limited to, social networks such as U.S. based services such as Facebook, Google+, Tumblr and Twitter; as well as Nexopia, Badoo, Bebo, VKontakte, Delphi, Hi5, Hyves, iWiW, Nasza-Klasa, Soup, Glocals, Skyrock, The Sphere, StudiVZ, Tagged, Tuenti, XING, Orkut, Mxit, Cyworld, Mixi, renren, weibo and Wretch.

"Social media" or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life™)

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A 'third party' or "third party provider" as used herein may refer to, but is not limited to, a so-called "arm's length"

provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals which includes, but is not limited to, private individuals, employees of organizations and/or enterprises, members of community organizations, members of charity organizations, men, women, children, and teenagers. In its broadest sense the user may further include, but not be limited to, software systems, mechanical systems, vehicle systems, physical assets, robotic systems, android systems, etc. that may be characterised by mobility and location such their location may be an aspect of them which is desired to be known at a particular instant.

An "event" as used herein may refer to, but is not limited to, a planned public or social occasion, happening, proceeding, incident, affair, function, gathering, "bash", competition, contest, tournament, round, fixture, race, conference, meeting, and appointment.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

The system(s) and/or application(s) described below in respect of embodiments of the invention may be employed in a standalone manner or they may, alternatively, be a feature of or be used as part of a larger system for creating, managing, running and/or coordinating an event. Within the embodiments of the invention described below these are described with respect to event management software applications/platforms (EMSAPs) that support communications between users associated with an event or activity by their roles and assignments to said roles without any prior knowledge of the others users by the user as this is coordinated through supervisory/management roles employing the EMSAPs according to embodiments of the invention.

Within the following description and reference to FIGS. 1 to 8 the invention is presented with respect to an inventive system allowing event planners to manage personnel associated with an event or a shift/role within the event. The functionality of the event management software applications/platforms (EMSAPs) accessed by the user(s) are defined in terms of a hierarchy. Accordingly, users (e.g. volunteers) need only download the software application to their smartphone, for example, and then subsequently the software application's functionality and, in some instances, even access to the software application and/or its features is defined by association of the user to a role, to a shift, to a location, to a venue, and to an event. For example, a volunteer to the Rio de Janerio 2016 Olympics may be associated therefore to this as the event, the location for them is the Rodrigo de Freitas Lagoon, site of rowing and canoeing competitions, their shift may be 5am-1pm Sunday Aug. 9, 2016, and their role is security. In some instances, their role may define the location to even greater precision and/or define a geofenced location associated with their shift. For example, this user is assigned to security may be given a geofenced region of the Parque Natural Municipal Jose Guilherme Merquior on the eastern shore of the lagoon. In contrast a ticket role may defined as being Gate 1 at Parque dos Patins—Lagoa on Av. Borges de Medeiros.

Within the following description and reference to FIGS. 1 to 8 the invention is presented with respect to embodiments of the invention allowing event planners to set up a staff schedule starting with the venue, a location within the venue, defined shifts within the venue or location, roles within each shift, and the people assigned to each shift/role. Using a structure with respect to an inventive system wherein the embodiments of the invention may exploit a structure described and depicted within the World Patent Application PCT/CA2013/000717 entitled "A Communication System Facilitating a Contextual Environment for a User Filing Various Role Agents" published Apr. 10, 2014 and filed Aug. 15, 2013. However, it would be evident that other hierarchies and associations of users to activities, tasks, roles, shifts etc. may be employed without departing from the scope of the invention.

Embodiments of the invention provide a system for easily reporting to a staff manager/shift supervisor etc. when a specific role or roles at a specific time and/or location does not have enough individuals to meet the requirements for the role/shift to be effectively performed. Roles for the event are created by the event planner. Whereas the aforementioned patent applications describe a way of routing communications based on a connection (policy chain) to get to the right organization, then mission, then role within a mission, the embodiments of the invention uses the same structure to determine a specific group of people at a specific time, which then exploit one or more rule and/or criteria to determine if there are sufficient individuals to meet the requirements for the role/shift to be effectively performed and accordingly, communicate the lack of resources to the staff manger. Further, through accessing location information of individuals associated with a shift an anticipated shortfall in individuals for the shift may be established thereby triggering a notification to a staff manager/shift supervisor.

The people in a role or venue can change based on shift time and staff can sign in and out of shifts for breaks. The staff manager needs to be able to know in real time when a staffing problem exists, and be able to fix it immediately.

Referring to FIG. 1A there is depicted an event management server 100 connected to a network 107, such as a local area network, wide area network, or global network such as the Internet, commonly referred to as the "cloud." For each organization 114, e.g. Organizations 1 to N, there may be multiple events, e.g. Event 1 to Event N, each executing a separate instance of the EMSAP, namely Event 1 101 and Event N 102. Also depicted is a database 103, also connected to the network 107 which stores all the data specific to each organization's events, e.g. Event 1 Data 110 and Event N Data 111. The database 103 also contains user data, e.g. User 1 112 and User M 113, which is data specific to each user using the system. This data includes, typically, for each user a mobile phone number associated with the user's smartphone or wirelessly connected PED to a telecommunications infrastructure. A plurality of web pages 117 are used to program all the elements of the system and store them in the database 103. The web pages 117 can also be used to display real time information to any specific user of the system with the appropriate privileges, as known in the art. Each user of the system has a specific role at a specific time and has a device 105 (e.g. smartphone, tablet computer or PED with web access). Each device 105 has an event application (EVAP) 109 running as an embodiment of a EMSAP according to an embodiment of the invention. Data can be sent from the event management server 100 to the device 105 via the network 107 and to the EVAP 109. The EVAP 109 may also store its own data with a PED data store 116.

Figure 1B:
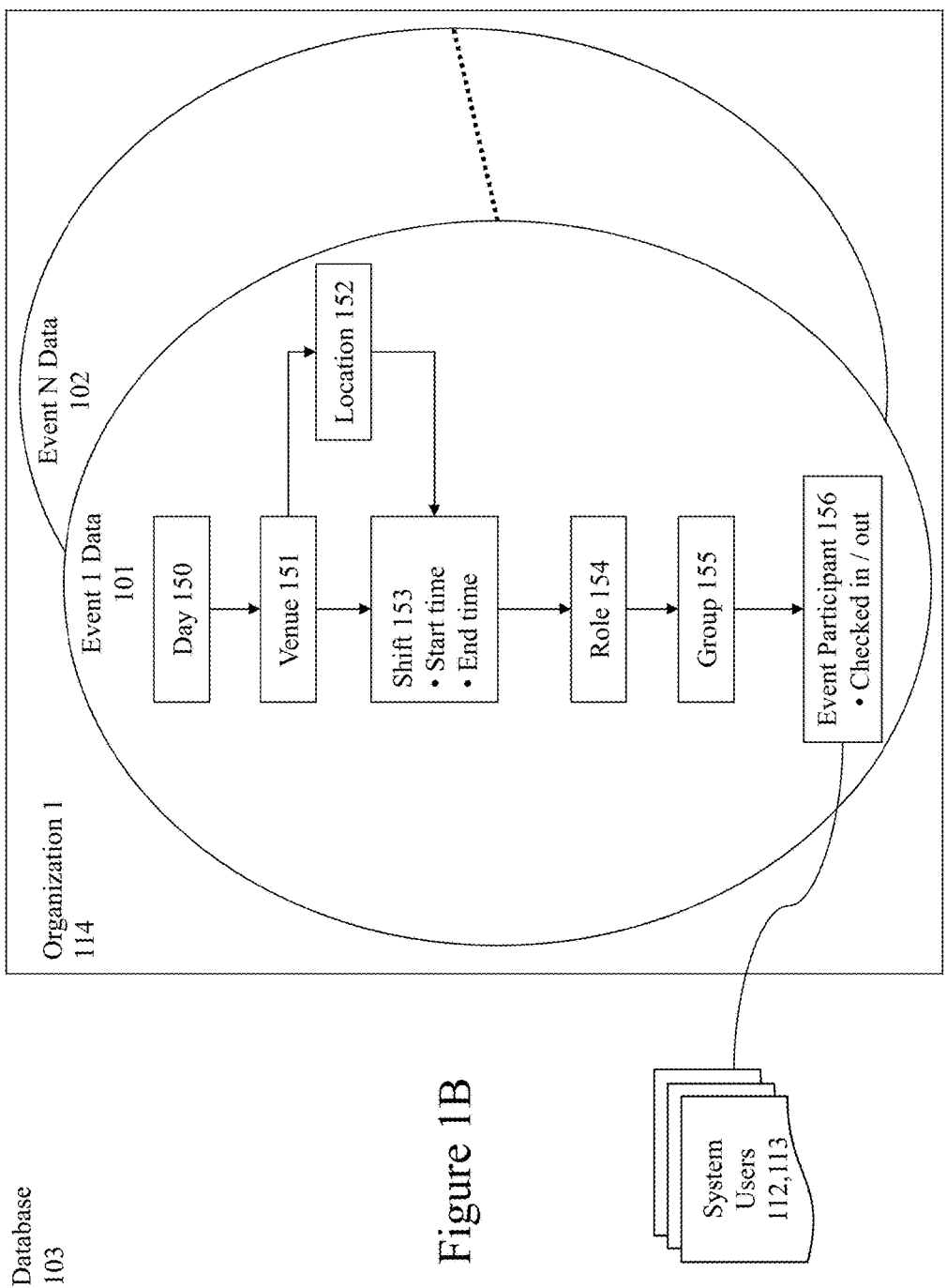
FIG. 1B depicts schematically a hierarchy of the tables within a database according to an embodiment of the invention.

Referring to FIG. 1B there is depicted an example of hierarchy of the event data, e.g. Event 1 101 and Event N 102, for an organization according to an embodiment of the invention, e.g. Organization 1 114, in the database 103. As depicted the hierarchy comprises:

Days 150, which may contain venues 15 associated with a day or days;
Venues 151, which can contain locations 152 associated with the location(s);
Shifts 153, which can exist for either venues 151 or locations 152 and may contain, for example, start times and end times.
Roles 154, which are generally contained within shifts 153 and are filled by a group 155;
Groups 155 which define the users associated to them and may range from a single participant 156 to all participants associated to the event.

Each participant 156 may also have one or more statuses associated, such as reported, in shift, out of shift (break), checked in, checked out, etc. The event participant 156 also points to a user 112, 113 in the database 103.

Figure 2:
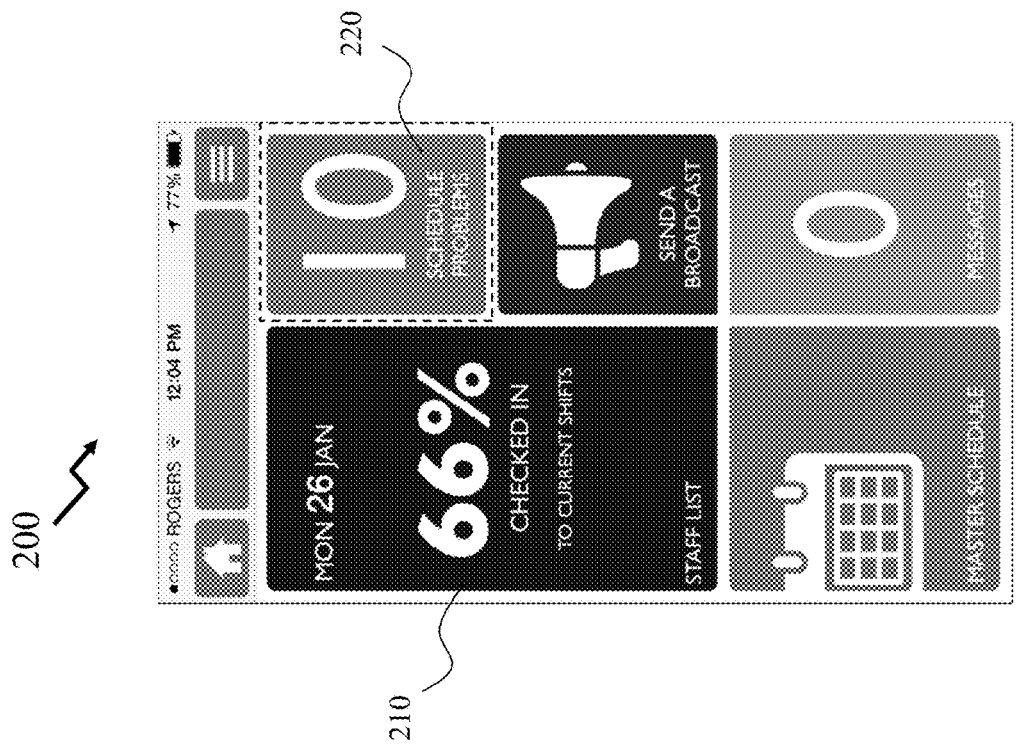
FIG. 2 depicts schematically an exemplary screenshot of an event application upon a user's portable device indicating staffing problems associated with an event according to an embodiment of the invention.

Now referring to FIG. 2 there is depicted an exemplary supervisor screenshot 200 of an event application upon a user's portable device. Accordingly, within the screen presented to the user (supervisor/manager) a first indicator 210 presents an overall status of individuals checked in to the current shifts whilst second indicator 220 presents a count of scheduling problems. Within an embodiment of the invention an individual may be automatically "checked in" when they are within a geo-fence associated with their role/shift/event whereas in other embodiments other automatic, semi-automatic or manual methods of verifying presence of a user may be employed as known within the art. Hence, as indicated there are currently 10 scheduling problems for the supervisor/manager to address.

Figure 3:
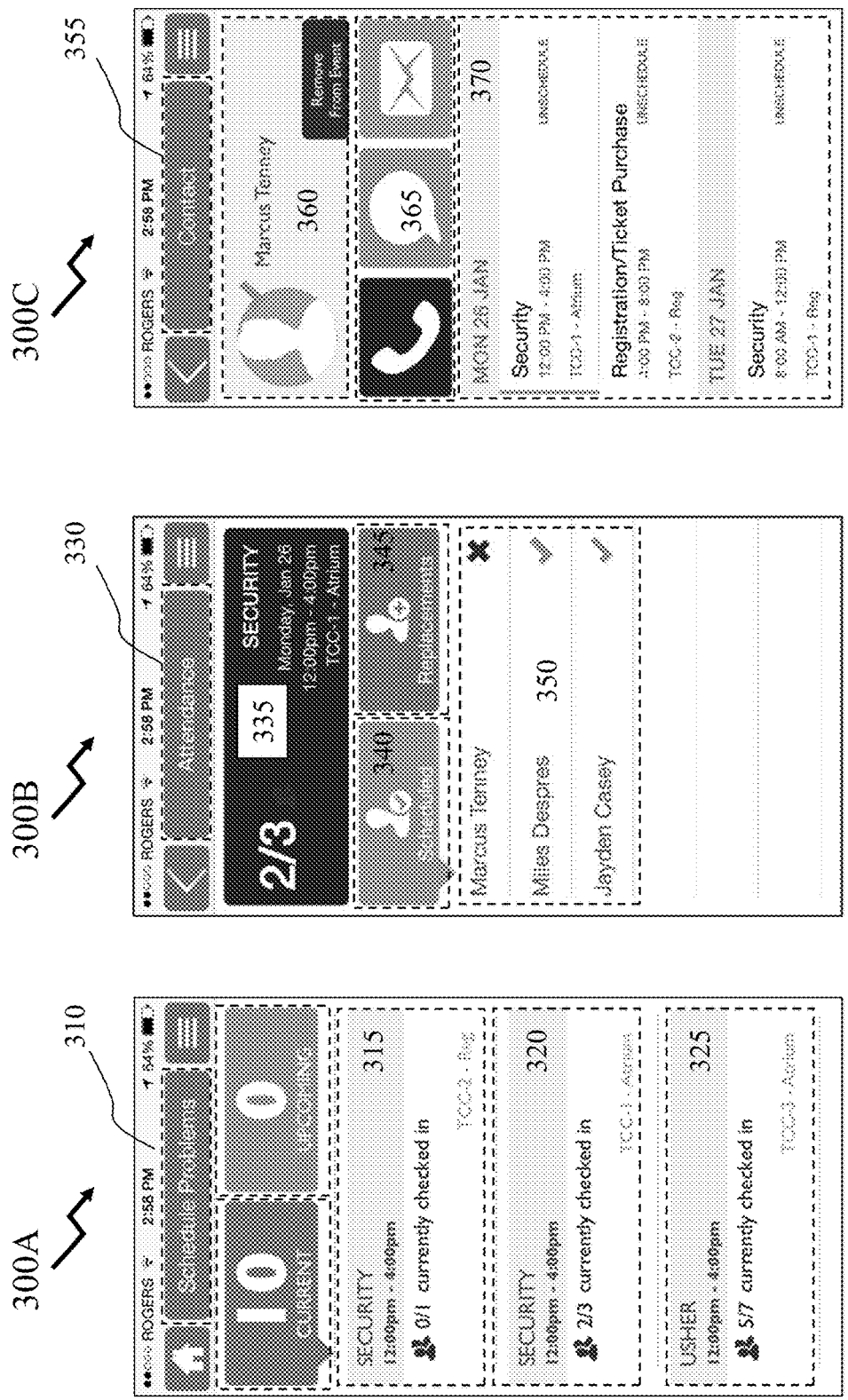
FIG. 3 depicts exemplary screenshots of an event application upon a user's portable device indicating the staff/role associated with a staffing problem within an event according to an embodiment of the invention.

If the user selects the second indicator 220 in exemplary supervisor screenshot 200 of FIG. 2 then they are presented with one or more of the first to third exemplary screenshots 300A to 300C depicted in FIG. 3 as view information relating to the staffing problem within an event according to an embodiment of the invention. Accordingly, in first screenshot 300A in FIG. 3 they are presented within a listing of current roles associated with the event with location differentiation. As such they are informed in first header 310 that they are looking at "Schedule Problems" and in first to third elements 315 to 325 is shown the role, e.g. Security, with location, e.g. "TCC-2 Reg" or "TCC-1 Atrium", and the current status of check-ins, e.g. "0/1" implying none checked in where a single individual is scheduled or "2/3" implying that whilst 2 individuals are checked in that one is still not checked in. If the user selects second element 320, i.e. the specific problem of security individuals within the location "TCC-1 Atrium" during the shift defined as "12:00 pm-4:00 pm" then they are presented with second screenshot 300B. Within this the second header 330 denotes that they are viewing the attendance data, fourth element 335 that they are looking specifically at the shift defined by Role=Security, Date=Monday, January 26, 12:00 pm Time 4:00 pm, and Location=TCC-1—Atrium and that 2 of the 3 allocated individuals have checked in. Second element 340 allows the user to display the individuals associated with this shift which are then displayed in seventh element 350 when fifth element 340 is selected. Sixth element 345 allows the user to alternatively address the identification of and communication to one or more replacements for the missing individual.

Optionally, the user may be able to select and query the non-checked-in individual within seventh element 350, i.e. "Marcus Tenney", using a method such as described and depicted within PCT/A2014/000,442 filed by the inventor May 20, 2014 entitled "System for Quickly Finding the Whereabouts of Friends." Selection of the individual "Marcus Tenney" within seventh element 350 triggers presentation of third exemplary screenshot 300C wherein third header 355 denotes that the user is viewing a contact profile for the non-checked-in individual. Eighth element 360 denotes that they are viewing the contact profile of "Marcus Tenney", whilst ninth element 365 provides the user with communication options which may be extended to include a "Where Are You" feature such as described and depicted in respect of PCT/A2014/000,442. Tenth element 370 depicts the individual's assigned shifts/roles, in this instance for "Marcus Tenney" who has not checked in. Accordingly, the supervisor/manager (user) may using the button within eighth element 360 remove the individual from the event completely or they may through the button options next to each shift remove the individual from that specific shift or may remove the individual from all remaining shifts on that day, etc. Other variations would be evident to one of skill in the art.

It would be evident therefore that the user may remove the individual from that current shift, seek to contact them, and then subsequently in the absence of any other information proceed to remove and replace them from other shifts, the event and potentially from all events as each event may be part of a larger event. Within embodiments of the invention the removal of an individual from a shift, multiple shifts, event etc. may be stored and accumulated such that if the individual has a history of not appearing for all shifts on a day then that may be indicated to the user so that they can factor that into their decision of what action(s) to take. Similarly, where an individual has a history of checking in late to an event then this may be similarly flagged/presented to the user so that they may for example be presented next to "Marcus Tenney" with the information "Typically 15 minutes late checking in" so that the user may delay a decision to replace on the expectation that the individual will check in albeit slightly late. Alternatively, this factor may be integrated into shift allocation(s) such that the individual is scheduled to start ahead of the actual shift or within the allocation of individuals to shifts. For example, the individual may be typically late for an early morning shift but never late for a mid-morning or afternoon shift. Similarly, an individual's acceptance/refusal history of shifts may be integrated to the allocation of individuals as if the individual never accepts an evening shift then they should be removed from consideration of this time in future shift/event allocations.

Figure 4:
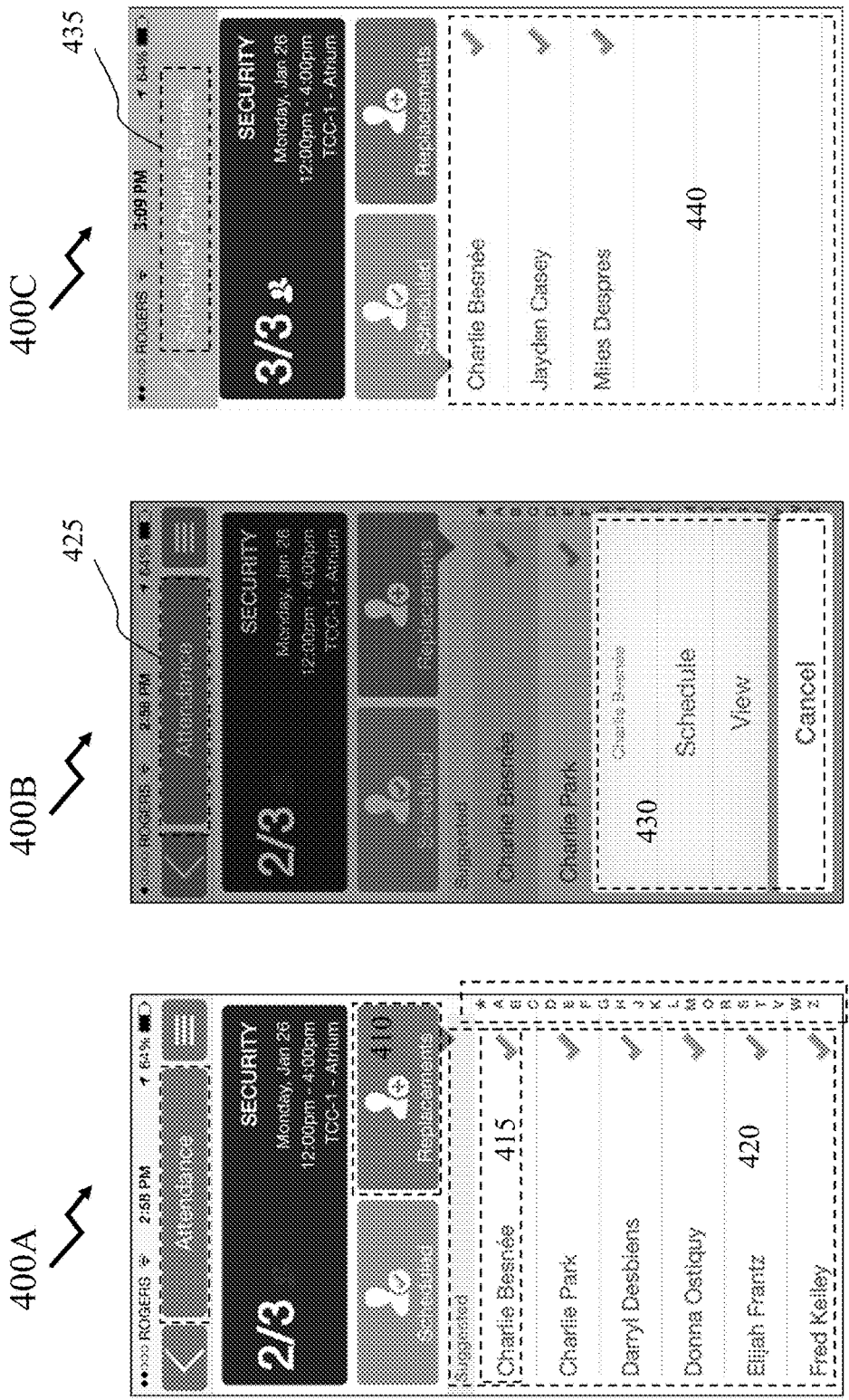
FIG. 4 depicts exemplary screenshots of an event application upon a user's portable device indicating the assignment of replacement staff to a staff/role associated with a staffing problem within an event according to an embodiment of the invention.

FIG. 4 depicts first to third exemplary screenshots 400A to 400C of an event application upon a user's portable device indicating the assignment of replacement staff to a staff/role associated with a staffing problem within an event according to an embodiment of the invention. If within second exemplary screenshot 300B in FIG. 3 sixth element 345 was selected, e.g. first element 410 in first exemplary screenshot 400A, then the display, would as depicted in first exemplary screenshot 400A, present the user with a list of individuals who may provide a suitable replacement to the missing individual, e.g. as commonly known the "no-show." This list being presented within second element 420 where if the number of individuals is larger than can be displayed the user is presented with an address book type functionality allowing them to display individuals with surnames in certain bands as indicated by third element 455. Alternatively, or in combination with the third element 455, the user may be presented with a scrollbar allowing them to move through a larger list. Selection of a user, e.g. "Charlie Besnee" in fourth element 415, results in the fifth element 430 within second exemplary screenshot 400B being displayed with that allows the user to schedule the individual for a shift, view the individual's profile, or cancel and return to select another individual. Selection of "Schedule" results in the replacement of "Marcus Tenney" with "Charles Besnee."

Within third exemplary screenshot 400C at a point later in time "Charles Besnee" is shown as checked-in within seventh element 440. Initially, third exemplary screenshot 400C may depict the replacement individual with a symbol indicating that they are a replacement if not checked in yet so the user remembers this when coming back to the issue again if they have forgotten what action(s) they performed. In some instances, the replacement individual may be checked in immediately as they are being re-allocated from another shift/role within the event overlapping in time. Whilst not explicitly depicted within the exemplary screenshots within FIGS. 2 to 5 such an option may be presented either in each instance or where the EMSAP determines that no other individuals are available to fulfil the role for that shift. Such a non-availability of individuals may arise from timing of the shift, location of the shift relative to the individuals, requirement of the shift relative to the skills of the individuals logged into the EMSAP. For example, a shift for the individuals may have a travel time such that they would not be able to complete more than some predetermined portion of the shift which limits their effectiveness as a replacement. Alternatively, a shift requiring an individual speaking English and Chinese may similarly limit the options for available individuals or a shift upon an event that is mobile, e.g. a cruise, tour, etc., may mean only those available at the time of departure can be considered.

Figure 5:
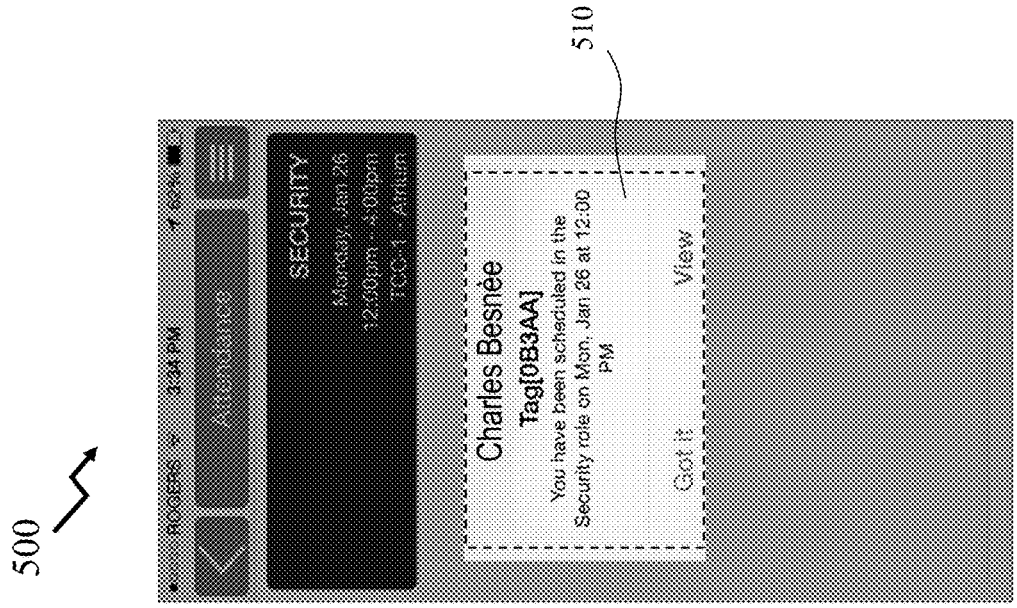
FIG. 5 depicts schematically an exemplary screenshot of an event application upon a user's portable device depicting a message received by an individual associated with an event according to an embodiment of the invention.

Once the user schedules an individual, e.g. "Charles Besnèe", then the individual receives a notification within the EMSAP in execution upon their electronic device, e.g. a PED, as indicated with first element 510 in exemplary screenshot 500 in FIG. 5. The individual can then confirm by selecting "Got It" or viewing the shift by selecting "View." Optionally, the user may also be presented with a "Decline" option. Within embodiments of the invention the EMSAP may reset a problem if a replacement individual does not confirm within a predetermined period of time from issuance of the notification or by a predetermined time relative to the shift in question such that the user is aware that the problem has not been addressed.

Figure 6:
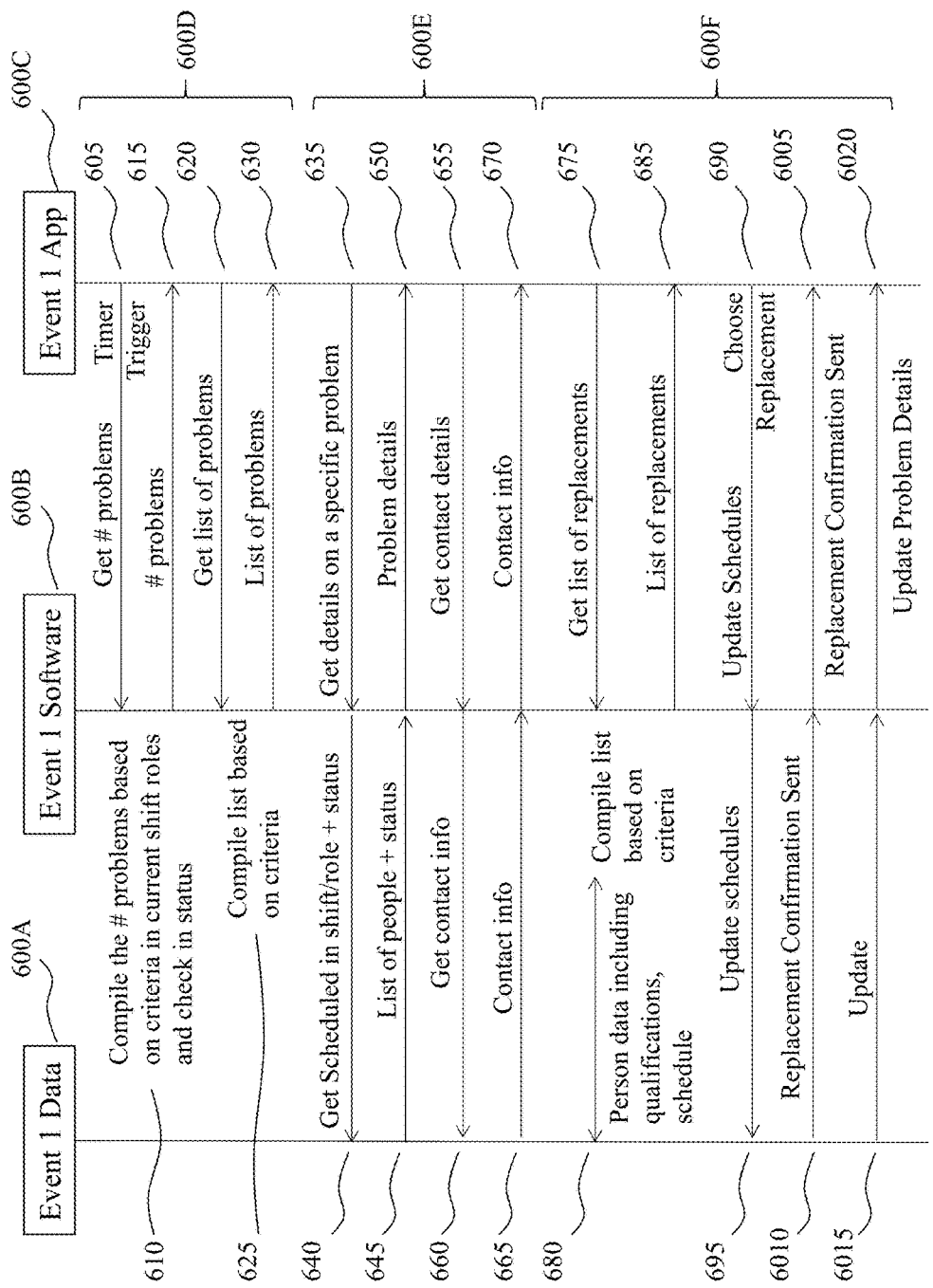
FIG. 6 depicts schematically an exemplary message flow diagram for a process relating to an event application with respect to staffing problems associated with an event according to an embodiment of the invention.

Now referring to FIG. 6 there is depicted schematically an exemplary message flow diagram for a process relating to an event application with respect to staffing problems associated with an event according to an embodiment of the invention. As depicted the exemplary process flow mirrors that described and depicted in respect of FIGS. 2 to 5 between "Event 1 Data" (EV1D) 600A stored within memory in communication with a server hosting an EMSAP, "Event 1 Software" (EV1S) 600B on the server executing the EMSAP, and an "Event 1 App" (EV1A) 600C, being an EMSAP, in execution upon an electronic device, e.g. a PED or FED, associated with the user. Accordingly, within first sub-flow 600D the exemplary message flow comprises:

First step 605 which may be based upon a timer in execution within the user's EMSAP or a user triggered request wherein the EV1A 600C sends a request to EV 600B for an update of problems associated with the shift(s) and/or role(s) and/or event(s) the user is currently managing (such that the supervisor shift may be set to start before all other shifts for example so that they are active prior to the first shift of others associated with the event);

Second step 610 wherein the EV1S 600B queries the EV1D 600A to establish the shift(s) and/or role(s) and/or event(s) the user is currently managing and the status of the individuals associated with these shift(s) and/or role(s) and/or event(s);

Third step 615 wherein the EV 600B communicates how many problems have been identified to the EV1A 600C for the user to subsequently access and/or view and/or resolve;

Fourth step 620 wherein the user requests a list of the current problems from EV1S 600B;

Fifth step 625 wherein the EV 600B extracts the specific problem information; and Sixth step 630 wherein the EV 600B communications the specific problem information to the user's EV1A 600C.

Accordingly, in first sub-flow 600D the user is presented with the number of problems and associated summary data such as described and depicted in respect of FIG. 2. In second sub-flow 600E the user establishes a specific problem and individual(s) associated with the problem and then may establish communications with them such as through ninth element 365 in third exemplary screenshot 300C in FIG. 3. Accordingly, second sub-flow 600E comprises the steps:

Seventh step 635 wherein the user via the EV1A 600C requests details on a specific problem;

Eighth Step 640 wherein the EV 600B upon receiving the request from the EV 600C polls the EV1D 600A for the appropriate information;

Ninth step 645 wherein the EV1D 600A upon receiving the request from the EV1A 600B provides the appropriate information;

Tenth step 650 wherein the EV1S 600B provides the problem details to the EV1A 600C and hence to the user;

Eleventh step 655 wherein the user selects an individual associated with the problem and requests to contact the user thorough the EV1A 600C wherein a request for the user's contact data is transmitted to the EV1S 600B;

Twelfth step 660 wherein the EV 600B requests the required contact data of the individual from the EV1D 600A, e.g. their phone number, email address etc. in dependence upon the selected means of communication within ninth element 365 in third exemplary screenshot 300C in FIG. 3;

Thirteenth step 665 where the contact data is provided to the EV 600B; and Fourteenth step 670 where the EV1A 600C receives the contact data from the EV 600B and triggers opening of the communication session, e.g. phone, text or email for example.

In third sub-flow 600F the user identifies and establishes a replacement individual with respect to a specific problem and as such reflects elements of the steps presented within the exemplary screenshots presented within FIGS. 4 and 5. Accordingly, third sub-flow 600F comprises the steps:

Fifteenth step 675 wherein having identified a problem and wishing to identify a replacement individual the user via EV1A 600C requests from EV1S 600B a list of replacements;

Sixteenth step 680 wherein the EV 600B polls the EV1D 600A with respect to the shift/role/location associated with the "no-show" or missing individual and receives back a compiled list based upon the criteria associated with the shift/role/location and the individuals associated with the shift/role/location;

Seventeenth step 685 wherein the compiled list is presented to the EV1A 600C from the EV 600B;

Eighteenth step 690 wherein the user selects a replacement from the compiled list of individuals and this is communicated to the EV1S 600B which updates schedules etc.

Nineteenth step 695 wherein the replacement identity is communication to the EV1D 600A which triggers communications to the replacement individual (not shown within the message flow);

Twentieth step 6005 where a confirmation from the replacement individual received within the EV1D 600A is communicated to the EV 600B and thereafter in twenty-first step 6010 this confirmation is provided to the EV1A 600C (this may be optionally removed);

Twenty-second step 6015 wherein based upon the conditions set for the replacement, e.g. await confirmation, wait predetermined period of time, etc. then an update is communicated from the EV1D 600A to the EV1S 600B and thereafter in twenty-third step 6020 to the EV1A 600C such that the problem details and problem summary are updated.

Figure 7:
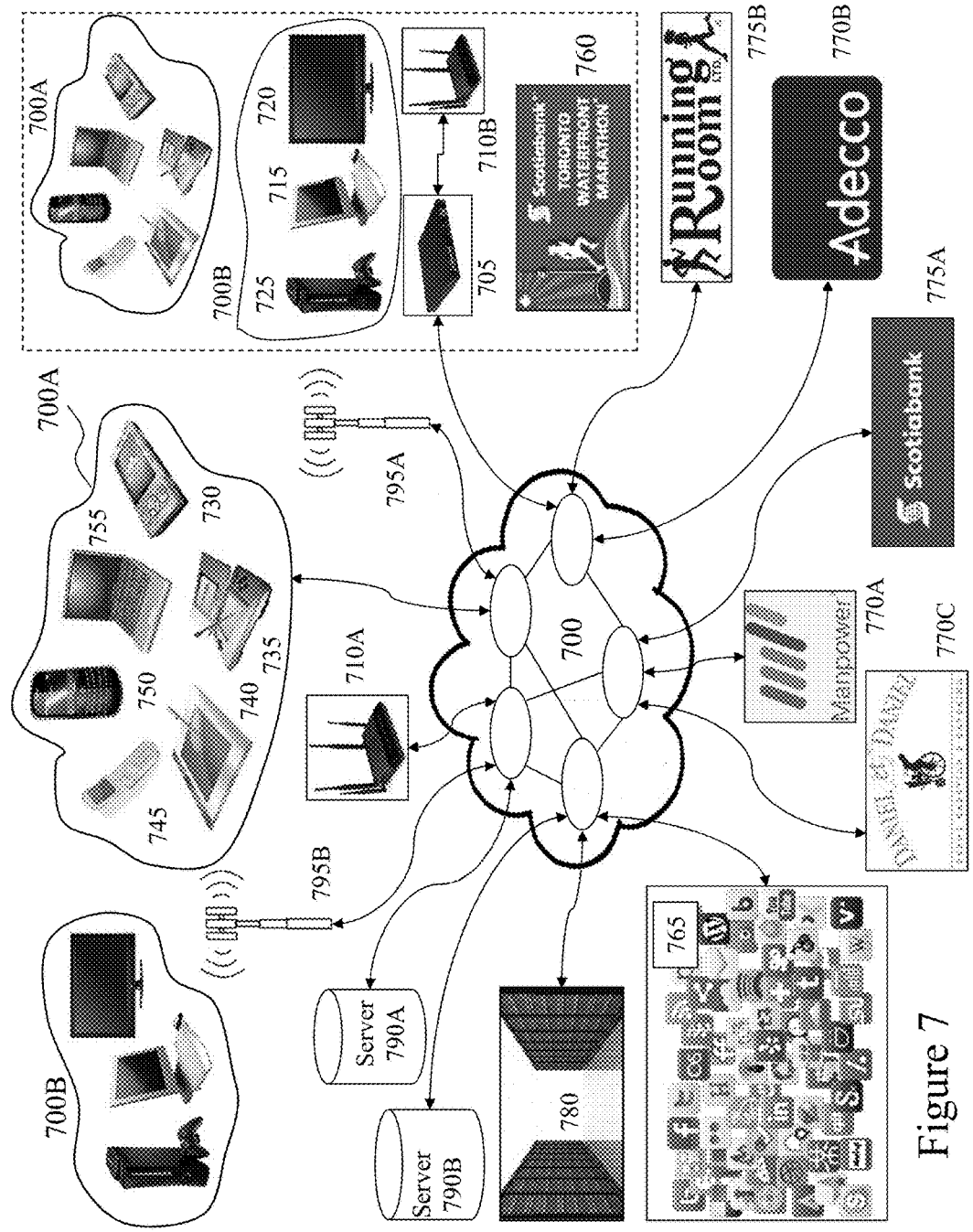
FIG. 7 depicts a network environment within which embodiments of the invention may be employed.

Now referring to FIG. 7 there is depicted a network environment 700 within which embodiments of the invention may be employed supporting "push to talk" or "walkie-talkie" applications/platforms (EMSAPs) according to embodiments of the invention. Such WKWTAPs, for example supporting multiple device types, multiple communication channels, fixed content, dynamic content, etc. As shown first and second user groups 700A and 700B respectively interface to a telecommunications network 700. Within the representative telecommunication architecture, a remote central exchange 780 communicates with the remainder of a telecommunication service providers network via the network 700 which may include for example long-haul OC-48/OC-192 backbone elements, an OC-48 wide area network (WAN), a Passive Optical Network, and a Wireless Link. The central exchange 780 is connected via the network 700 to local, regional, and international exchanges (not shown for clarity) and therein through network 700 to first and second cellular APs 795A and 795B respectively which provide Wi-Fi cells for first and second user groups 700A and 700B respectively. Also connected to the network 700 are first and second Wi-Fi nodes 710A and 710B, the latter of which being coupled to network 700 via router 705. Second Wi-Fi node 710B is associated with Enterprise 760, e.g. Toronto Waterfront Marathon™, within which other first and second user groups 700A and 700B exist. Second user group 700B may also be connected to the network 700 via wired interfaces including, but not limited to, DSL, Dial-Up, DOCSIS, Ethernet, G.hn, ISDN, MoCA, PON, and Power line communication (PLC) which may or may not be routed through a router such as router 705.

Within the cell associated with first AP 710A the first group of users 700A may employ a variety of PEDs including for example, laptop computer 755, portable gaming console 735, tablet computer 740, smartphone 750, cellular telephone 745 as well as portable multimedia player 730. Within the cell associated with second AP 710B are the second group of users 700B which may employ a variety of FEDs including for example gaming console 725, personal computer 715 and wireless/Internet enabled television 720 as well as cable modem 705. First and second cellular APs 795A and 795B respectively provide, for example, cellular GSM (Global System for Mobile Communications) telephony services as well as 3G and 4G evolved services with enhanced data transport support. Second cellular AP 795B provides coverage in the exemplary embodiment to first and second user groups 700A and 700B. Alternatively the first and second user groups 700A and 700B may be geographically disparate and access the network 700 through multiple APs, not shown for clarity, distributed geographically by the network operator or operators. First cellular AP 795A as show provides coverage to first user group 700A and environment 770, which comprises second user group 700B as well as first user group 700A. Accordingly, the first and second user groups 700A and 700B may according to their particular communications interfaces communicate to the network 700 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices within first user group 700A may form associations either through standards such as IEEE 802.15 and Bluetooth as well in an ad-hoc manner.

Also connected to the network 700 are Social Networks (SOCNETS) 765, first and second personnel providers 770A and 770B respectively, e.g. Manpower™ and Adecco™ catering service provider 770C, e.g. Daniel & Daniel (Toronto, Canada), and first to second partner enterprises 775A and 775B respectively, e.g. Scotiabank™ and Running Room™, as well as first and second servers 790A and 790B which together with others, not shown for clarity. First and second servers 790A and 790B may host according to embodiments of the inventions multiple services associated with a provider of WKWTAPs; a provider of a SOCNET or Social Media (SOME) exploiting WKWTAP features; a provider of a SOCNET and/or SOME not exploiting WKWTAP features; a provider of services to PEDS and/or FEDS; a provider of one or more aspects of wired and/or wireless communications; an Enterprise 760 exploiting WKWTAP features; license databases; content databases; event databases; registration databases; customer databases; contact databases; websites; and software applications for download to or access by FEDs and/or PEDs exploiting and/or hosting WKWTAP features. First and second primary content servers 790A and 790B may also host for example other Internet services such as a search engine, financial services, third party applications and other Internet based services.

Accordingly, an enterprise user or individual user (ENU-INU) may exploit a PED and/or FED within an Enterprise 760, for example, and access one of the first or second primary content servers 790A and 790B respectively to perform an operation such as accessing/downloading an application which provides WKWTAP features according to embodiments of the invention; execute an application already installed providing WKWTAP features; execute a web based application providing WKWTAP features; or exploit WKWTAP features within another application. Similarly, an ENUINU may undertake such actions or others exploiting embodiments of the invention exploiting a PED or FED within first and second user groups 700A and 700B respectively via one of first and second cellular APs 795A and 795B respectively and first Wi-Fi nodes 710A.

Figure 8:
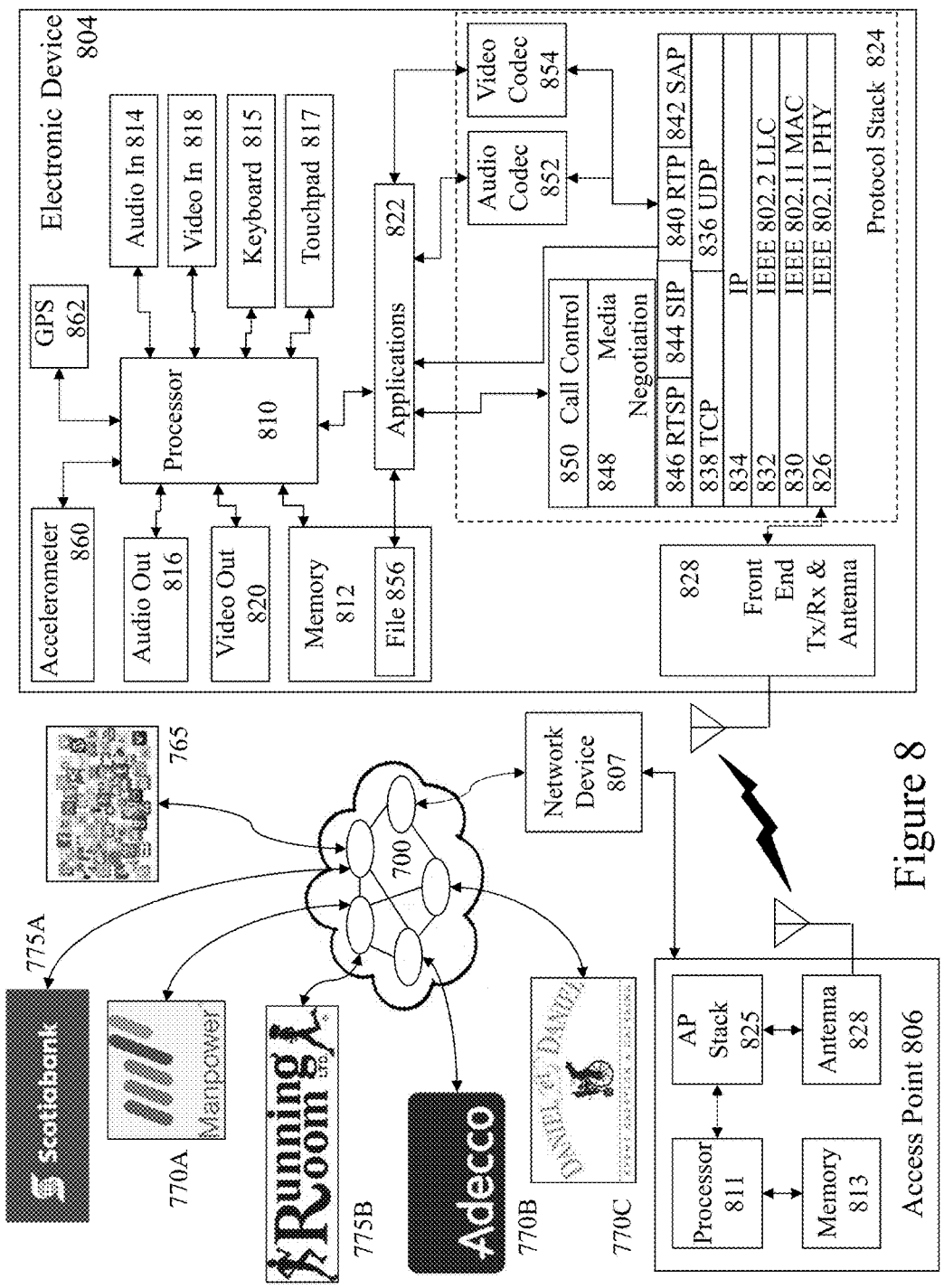
FIG. 8 depicts a wireless portable electronic device supporting communications to a network such as depicted in FIG. 7 and as supporting embodiments of the invention.

Now referring to FIG. 8 there is depicted an electronic device 804 and network access point 807 supporting WKWTAP features according to embodiments of the invention. Electronic device 804 may, for example, be a PED and/or FED and may include additional elements above and beyond those described and depicted. Also depicted within the electronic device 804 is the protocol architecture as part of a simplified functional diagram of a system 700 that includes an electronic device 804, such as a smartphone 755, an access point (AP) 806, such as first AP 810, and one or more network devices 807, such as communication servers, streaming media servers, and routers for example such as first and second servers 790A and 790B respectively. Network devices 807 may be coupled to AP 806 via any combination of networks, wired, wireless and/or optical communication links such as discussed above in respect of FIG. 7 as well as directly as indicated. Network devices 807 are coupled to network 700 and therein Social Networks (SOCNETS) 765, first and second personnel providers 770A and 770B respectively, e.g. Manpower™ and Adecco™, catering service provider 770C, e.g. Daniel & Daniel (Toronto, Canada), and first to second partner enterprises 775A and 775B respectively, e.g. Scotiabank™ and Running Room™.

The electronic device 804 includes one or more processors 810 and a memory 812 coupled to processor(s) 810. AP 806 also includes one or more processors 811 and a memory 813 coupled to processor(s) 810. A non-exhaustive list of examples for any of processors 810 and 811 includes a central processing unit (CPU), a digital signal processor (DSP), a reduced instruction set computer (RISC), a complex instruction set computer (CISC) and the like. Furthermore, any of processors 810 and 811 may be part of application specific integrated circuits (ASICs) or may be a part of application specific standard products (ASSPs). A non-exhaustive list of examples for memories 812 and 813 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 804 may include an audio input element 814, for example a microphone, and an audio output element 816, for example, a speaker, coupled to any of processors 810. Electronic device 804 may include a video input element 818, for example, a video camera or camera, and a video output element 820, for example an LCD display, coupled to any of processors 810. Electronic device 804 also includes a keyboard 815 and touchpad 817 which may for example be a physical keyboard and touchpad allowing the user to enter content or select functions within one of more applications 822. Alternatively, the keyboard 815 and touchpad 817 may be predetermined regions of a touch sensitive element forming part of the display within the electronic device 804. The one or more applications 822 that are typically stored in memory 812 and are executable by any combination of processors 810. Electronic device 804 also includes accelerometer 860 providing three-dimensional motion input to the process 810 and GPS 862 which provides geographical location information to processor 810.

Electronic device 804 includes a protocol stack 824 and AP 806 includes a communication stack 825. Within system 800 protocol stack 824 is shown as IEEE 802.11 protocol stack but alternatively may exploit other protocol stacks such as an Internet Engineering Task Force (IETF) multimedia protocol stack for example. Likewise, AP stack 825 exploits a protocol stack but is not expanded for clarity. Elements of protocol stack 824 and AP stack 825 may be implemented in any combination of software, firmware and/or hardware. Protocol stack 824 includes an IEEE 802.11-compatible PHY module 826 that is coupled to one or more Front-End Tx/Rx & Antenna 828, an IEEE 802.11-compatible MAC module 830 coupled to an IEEE 802.2-compatible LLC module 832. Protocol stack 824 includes a network layer IP module 834, a transport layer User Datagram Protocol (UDP) module 836 and a transport layer Transmission Control Protocol (TCP) module 838.

Protocol stack 824 also includes a session layer Real Time Transport Protocol (RTP) module 840, a Session Announcement Protocol (SAP) module 842, a Session Initiation Protocol (SIP) module 844 and a Real Time Streaming Protocol (RTSP) module 846. Protocol stack 824 includes a presentation layer media negotiation module 848, a call control module 850, one or more audio codecs 852 and one or more video codecs 854. Applications 822 may be able to create maintain and/or terminate communication sessions with any of devices 807 by way of AP 806. Typically, applications 822 may activate any of the SAP, SIP, RTSP, media negotiation and call control modules for that purpose. Typically, information may propagate from the SAP, SIP, RTSP, media negotiation and call control modules to PHY module 826 through TCP module 838, IP module 834, LLC module 832 and MAC module 830.

It would be apparent to one skilled in the art that elements of the electronic device 804 may also be implemented within the AP 806 including but not limited to one or more elements of the protocol stack 824, including for example an IEEE 802.11-compatible PHY module, an IEEE 802.11-compatible MAC module, and an IEEE 802.2-compatible LLC module 832. The AP 806 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 804 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Whilst the above description and examples have been primarily presented with respect to communications for personnel within events such as sports events, festivals, etc. it would be evident to one of skill in the art that the concepts may be applied to a variety of other environments including, for example, workplace communications, sports team communications, etc.

Whilst the above description and examples have been primarily presented with respect to users employing their own PEDs it would be evident that embodiments of the invention may be supported by other devices.

Within the embodiments of the invention the establishment of a replacement and/or replacements has been implied and/or described as being performed on an individual by individual basis as the examples of personnel requirements per shift/role have been only a couple of individuals. However, in other embodiments of the invention a shift/role may be associated with a large number of individuals, e.g. volunteers, such that the number of individuals for whom replacements are needed is ten, tens, a hundred or more. Embodiments of the invention may where the number of individuals exceeds a predetermined threshold and/or at user selection send requests for invitations to all individuals meeting the shift/role/location criteria wherein the message indicates that it is a "flood" or "broadcast" request and that either the first individuals replying up to the number required and/or all individuals are then scheduled to the shift. Such "flood" or "broadcast" requests may also be associated with unplanned—unscheduled requirements in order to find employees/volunteers etc. to support this unplanned—unscheduled need.

Within embodiments of the invention an EMSAP may access location information of individuals associated with a shift in order to ascertain whether an anticipated shortfall in individuals for the shift may be established thereby triggering a notification to a staff manager/shift supervisor. Optionally, this may be an automatic notification triggered by the EMSAP wherein the trigger is set a predetermined period of time prior to the shift start, for example, or alternatively when a predetermined portion of the shift have checked-in and/or based upon historical performance data of the individuals and/or event/shift/role etc. In embodiments of the invention the user may have pre-authorised the EMSAP to provide their location information in respect of each shift/role/event they have accepted or alternatively no authorisation is given and each request is addressed uniquely by the individual within the EMSAP.

It would be evident that communications within embodiments of the invention may be encrypted and that, for example, security personnel at an event may exploit encryption whilst other communications are open or increased security may be associated with a portion of the event defined by a geo-fence such that users can only communicate in their role/shift etc. when within the geo-fence and that such communications may be optionally encrypted. Optionally, different geofenced regions may be associated with different encryption keys so that communications within security personnel are defined further by geolocation/geofencing specific encryption keys that are only valid for a specific shift and/or role.

Geolocation/geofencing may exploit a system within the user's PED such as GPS, for example, or it may alternatively exploit one or more other techniques as known within the art such as transmitter identity, transmitter triangulation, received signal strengths from transmitters, localized beacons, etc. A venue may be a "zoned" into a number of micro-venues defined by one or more geo-location/geo-fencing aspects. Further beacons may be established such that a geo-fence is defined by the one or more beacons currently accessible to the user's PED.

The EMSAPs as described and depicted have been primarily presented from the user's viewpoint as a software application in execution upon their PED, for example. However, in other embodiments of the invention the EMSAP may be accessed and/or configured through web pages or web browsers. Such web pages may be accessed on the user's PED or they may alternatively be accessed upon a FED. Accordingly, for example, ticket office personnel may have a browser window open providing them with EMSAP content whilst their screen also provides the ticket sales management application.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system comprising:
an event management server connected to a network and comprising a memory, the event management server configured to:
  generate with the memory a database comprising data relating to a plurality of organizations associated with one or more real world pre-scheduled events (events), the database defining the one or more events, one or more venues associated with the one or more events, one or more shifts within the one or more venues, one or more roles within each shift of the one or more shifts, and one or more users of a plurality of users associated with the event assigned to each one or more shifts and one or more roles;
  receive input data from an organizer of an event relating to an organization of the plurality of organizations for storage within the database, the input data transmitted to the event management server via the network from a first electronic device and relating to the definition of the event;
  create a plurality of policy chains in dependence upon the input data established by the organizer, each policy chain for defining at least routing for communications by defining a hierarchy comprising an event, a venue, a shift, a role and a group comprising one or more users associated with the role;
  create a plurality of quotas, each quota defining the number of users with the group associated with a role for a shift associated with an event at a venue;
  transmit via the network one or more requests to a plurality of second electronic devices associated with users assigned to an event and assigned a role, a shift and a venue for the event;

receive from the plurality of second electronic devices via the network a plurality of responses generated in dependence upon the one or more requests;

establish in dependence upon each received response of the plurality of responses whether the user associated with the response is either checked in with respect to the venue and the shift for the event or will be checked in with respect to the venue and the shift for the event by the time the shift begins;

establish whether each quota for the shift at the venue has been or will be met; and where one or more quotas for the shift have not been met or will not be met transmitting notification data to a third electronic device associated with an individual associated with the event as established by a policy chain of the plurality of policy chains associated with the event; wherein the individual is assigned by the event management server in dependence upon a policy chain of the plurality of policy chains associated with the event;

the first electronic device connected to the network associated with the organizer of an event relating to an organization of the plurality of organizations comprising a first user interface and a first display, the first electronic device configured to:

render a first graphical user interface to the organizer upon the first display relating to the definition of the event upon the event management server;

receive a plurality of inputs made by the organizer with the first user interface relating to the definition of the event;

generate the input data in response to the inputs made by the organizer; and transmit the input data via the network to the event management server for storage within the database;

the plurality of second electronic devices, each second electronic device of the plurality of second electronic devices connected to the network, comprising a second user interface and a second display, associated with a user of the plurality of users, and executing an event software application for managing communications relating to the one or more pre-scheduled events and configuring the second electronic device of the second plurality of electronic devices to:

receive from the event management server one or more requests for the user of the plurality of users relating to the event and a role, a shift and a venue assigned to the user of the plurality of users;

render the one of more requests to the user of the plurality of users within a second graphical user interface upon the second display;

receive one or more responses to the one or more requests made by the user of the plurality of users with the second user interface; and transmit the one or more responses generated by the user of the plurality of users to the event management server; and the third electronic device connected to the network associated with the individual comprising a third user interface and a third display, the third electronic device configured to:

receive the notification data from the event management server; and render one or more notifications within a third graphical user interface upon the third display, the one or more notifications established in dependence upon the received notification data and each notification relating to a quota for the shift that has not been met or will not be met.

2. The system according to claim 1, wherein the event management server is further configured to:

transmit check-in data from the event management server to the third electronic device associated with the individual, the check-in data comprising first data relating to a plurality of groups of users associated with roles for the shift associated with the event at the venue, second data indicating each user with each group of users of the plurality of users, and third data relating to whether each user within each group of users of the plurality of users has checked in; and the third electronic device is further configured to:

render within the third graphical user interface a plurality of indicators, each indicator relating to a group of users of the plurality of groups of users;

receive a user input made by the individual with the third user interface, the user input relating to a selection made by the individual of a group of users of the plurality of users; and render within the third graphical user interface a first visual indication of each user within the selected group of users of the plurality of users established in dependence upon the second data and a second visual indication indicative of the check-in status of each user within the selected group of users of the plurality of users established in dependence upon the third data.

3. The system according to claim 1, wherein the event management server is further configured to:

transmit check-in data to the third electronic device, the check-in data comprising first data relating to the quotas for each group of users of a plurality of groups of users associated with roles for the shift associated with the event at the venue and second data relating to the number of users within each group of users that have checked in; and the third electronic device is further configured to:

render within the third graphical user interface a first visual indication of each role associated with each group of users of a plurality of groups of users, a second visual indication of the quota for that group of users of a plurality of groups of users, and a third visual indication of the number of users within the group of users of a plurality of groups of users that have checked in.

4. The system according to claim 1, wherein the third electronic device is further configured to:

receive user inputs entered via the third user interface, the user inputs relating to a selection made by the individual of a notification of the one or more notifications and a selection of an option to establish replacement users;

transmit the user inputs to the event management server via the network receive the other user data relating to other users capable of replacing those users within the group of users associated with the selected notification that have not checked in;

render within the third graphical user interface the identities of each other user of the other users capable of replacing those users within the group of users associated with the selected notification that have not checked in;

receive one or more selections entered via the third user interface, each selection relating to another user of the other users capable of replacing those users within the group of users associated with the selected notification that have not checked in; and transmit to each second electronic device associated with each another user of the other users selected by the individual an assignment request relating to the role associated with the notification selected by the individual; and the event management server is further configured to:
receive the user inputs from the third electronic device;
establish the other user data in dependence upon the user inputs, the other data relating to other users capable of replacing those users within the group of users associated with the selected notification that have not checked in; and
transmitting the other user data to the third electronic device.

5. The method according to claim 4, wherein
the other users capable of replacing those users within the group of users associated with the selected notification are established in dependence upon profiles of users registered for the event and a policy chain of the plurality of policy chains associated with the event and the role associated the group of users associated with the selected notification.

6. The system according to claim 1, wherein
the event management server is further configured to:
transmit user data to the third electronic device, the user data relating to the users within a group of users of a plurality of groups of users associated with roles for the shift associated with the event at the venue;
the third electronic device is further configured to:
render within the third graphical user interface a first visual indication of each user within the selected group of users of the plurality of users established in dependence upon the user data;
receive a user input entered via the third user interface, the user input relating to a selection made by the individual of a user of the group of users of the plurality of users; and
render within the third graphical user interface; wherein
selection of the button by the individual removes the user from the group of users of the plurality of users.

7. The system according to claim 6, wherein
the button is one of a plurality of buttons; wherein
the other buttons of the plurality of buttons allow the individual to either remove the user from all shifts associated with the event or remove the user from multiple events of which the event is one.

8. The system according to claim 1, wherein
the one or more users of the plurality of users associated with the event have registered for the event via the event software application upon their electronic device.

9. The system according to claim 1, wherein
a policy chain establishes:
a role, a venue, and a shift for the event; and
at least one of a qualification and a skill for a user to be associated with the role.

10. The system according to claim 1, wherein
each user of the plurality of users is not associated with an organization of the plurality of organizations associated with the event.

11. The system according to claim 1, wherein
each individual is not associated with an organization of the plurality of organizations associated with the event.

12. The system according to claim 1, wherein
a response of the plurality of responses received from the electronic device associated with a user of the plurality of users in response to a request of the one or more requests is a geographic location; wherein
the geographic location is transmitted from the electronic device associated with the user of the plurality of users to the event management server in response to the user providing a predetermined input upon a user interface of the electronic device associated with the user of the plurality of users in response to a prompt rendered upon a graphical user interface of the electronic device associated with the user of the plurality of user in response to receipt of the request of the one or more requests.

13. The method according to claim 1, wherein
the event management server is further configured to:
generate for each user of the plurality of users a user history, the user history established in dependence upon actual check-in times of the user of the plurality of users relative to shift start times for each shift the user of the plurality of users is assigned to for all events; and
transmit the user data to the third electronic device, the user data comprising first data relating to the users within a group of users of a plurality of groups of users associated with roles for the shift associated with the event at the venue and second data relating to their user history; and
the third electronic device is further configured to:
receive the user data from the event management server;
render within the third graphical user interface for each user within the selected group of users of the plurality of users a first visual indication established in dependence upon the first data and a second visual indication established in dependence upon the second data; and
receive user inputs entered via the third user interface, the user inputs relating to a selection made by the individual of a notification of the one or more notifications and a selection of an option to establish replacement users; and
transmit the user inputs to the event management server.

14. The system according to claim 1, wherein
the event management server is further configured to:
generate for each user of the plurality of users a user history, the user history established in dependence upon actual check-in times of the user of the plurality of users relative to shift start times for each shift the user of the plurality of users is assigned to for all events; and
the first electronic device is further configured to:
receive the user history for each user of a subset of the plurality of users; and
render within the first graphical user interface a visual indication established in dependence upon the user history for each user of a subset of the plurality of users in association with an identity of each user of the subset of the plurality of users displayed within the first graphical user interface.

15. The system according to claim 1, wherein
the event management server is further configured to
generate for each user of the plurality of users a user history, the user history established in dependence upon actual check-in times of the user of the plurality of users relative to shift start times for each shift the user of the plurality of users is assigned to for all events; wherein the event management server employs the user history for each user of the plurality of users when associating users to a role in dependence upon a policy chain of the plurality of chains associated with the event.

16. The system according to claim 1, wherein the third electronic device is further configured to:
receive user inputs entered via the third user interface, the user inputs relating to a selection made by the individual of a notification of the one or more notifications and a selection of an option to establish replacement users;
transmit the user inputs to the event management server via the network;
receive user data from the event management server, the user data relating to the users within a group of users of a plurality of groups of users associated with roles for the shift associated with the event at the venue;
render within the third graphical user interface a first visual indication of each user within the selected group of users established in dependence upon the user data;
receive other user data from the event management server, the other user data relating to other users capable of replacing those users within the group of users associated with the selected notification that have not checked in;
receive a first user input entered via the third user interface, the first user input relating to a selection made by the individual of a user of the group of users;
receive a second user input entered via the third user interface, the second user input relating to a selection made by the individual to establish a replacement for the selected user of the group of users;
render upon the third graphical user interface after receipt of the second user input the identities of each other user of the other users capable of replacing the selected user of the group of users;
receive a selection entered via the third user interface, the selection relating to another user of the other users capable of replacing those users within the group of users associated with the selected notification that have not checked in; and
automatically checking in the another user to the role associated with the notification selected by the individual as they are being re-allocated from another shift and another role within the event overlapping in time and venue with the role associated with the notification; and the event management server is further configured to:
receive from the third electronic device the user inputs relating to a selection made by the individual of a notification of the one or more notifications and a selection of an option to establish replacement users;
establish user data in dependence upon the user inputs, the user data relating to the users within a group of users of a plurality of groups of users associated with roles for the shift associated with the event at the venue;
transmit the user data to the third electronic device;
establish other user data, the other user data relating to other users capable of replacing those users within the group of users associated with the selected notification that have not checked in;
transmit the other user data to the third electronic device.

17. The system according to claim 1, wherein the event management server is further configured to:
establish a shortfall upon determining that one or more quotas for the shift have not been met or will not be met establishing with the event management server a shortfall, the shortfall being a difference between the number of users that have checked in and will check and the quota;
establish if the shortfall exceeds a predetermined threshold; and
upon a positive determination transmit a request to all users whose data is stored within the database and who fulfil the requirements for the role at the venue for that shift.

18. The system according to claim 1, wherein the event management server is further configured to:
establish either at a predetermined point in time prior to the shift start or when a predetermined portion of the users for all roles associated with the shift have checked in whether each quota for the shift at the venue has been or will be met; and
a first subset of the users associated with the shift for the venue at the event have pre-authorized a first software application in execution upon their second electronic device to automatically transmit their location information in response to the request from the event management server with respect to at least one of the role, shift, and event; and
a second subset of the users associated with the shift for the venue at the event who have not pre-authorized a second software application in execution upon their second electronic device to automatically transmit their location information in response to the request from the event management server provide a specific authorisation in response to the request via the second user interface of their second electronic device in order to release their location information.

19. A system comprising:

an event management server connected to a network and comprising a memory, the event management server configured to:
generate with the memory a database comprising data relating to a plurality of organizations associated with one or more real world pre-scheduled events (events), the database defining the one or more events, one or more venues associated with the one or more events, one or more shifts within the one or more venues, one or more roles within each shift of the one or more shifts, and one or more users of a plurality of users associated with the event assigned to each one or more shifts and one or more roles;
receive input data from an organizer of an event relating to an organization of the plurality of organizations for storage within the database, the input data transmitted to the event management server via the network from a first electronic device and relating to the definition of the event;
create a plurality of policy chains in dependence upon the input data established by the organizer, each policy chain for defining at least routing for communications by defining a hierarchy comprising an event, a venue, a shift, a role and a group comprising one or more users associated with the role;

create a plurality of quotas, each quota defining the number of users with the group associated with a role for a shift associated with an event at a venue;
transmit via the network one or more requests to a plurality of second electronic devices associated with users assigned to an event and assigned a role, a shift and a venue for the event;
receive from the plurality of second electronic devices via the network a plurality of responses generated in dependence upon the one or more requests;
establish in dependence upon each received response of the plurality of responses whether the user associated with the response is either checked in with respect to the venue and the shift for the event or will be checked in with respect to the venue and the shift for the event by the time the shift begins;
establish whether each quota for the shift at the venue has been or will be met; and
where one or more quotas for the shift have not been met or will not be met transmitting notification data to a third electronic device associated with an individual associated with the event as established by a policy chain of the plurality of policy chains associated with the event; wherein
the individual is assigned by the event management server in dependence upon a policy chain of the plurality of policy chains associated with the event;
the first electronic device connected to the network associated with the organizer of an event relating to an organization of the plurality of organizations comprising a first user interface and a first display, the first electronic device configured to:
render a first graphical user interface to the organizer upon the first display relating to the definition of the event upon the event management server;
receive a plurality of inputs made by the organizer with the first user interface relating to the definition of the event;
generate the input data in response to the inputs made by the organizer; and
transmit the input data via the network to the event management server for storage within the database;
the plurality of second electronic devices, each second electronic device of the plurality of second electronic devices connected to the network, comprising a second user interface and a second display, associated with a user of the plurality of users, and executing an event software application for managing communications relating to the one or more pre-scheduled events and configuring the second electronic device of the second plurality of electronic devices to:
receive from the event management server one or more requests for the user of the plurality of users relating to the event and a role, a shift and a venue assigned to the user of the plurality of users;
render the one of more requests to the user of the plurality of users within a second graphical user interface upon the second display;
receive one or more responses to the one or more requests made by the user of the plurality of users with the second user interface; and
transmit the one or more responses generated by the user of the plurality of users to the event management server; and the third electronic device connected to the network associated with the individual comprising a third user interface and a third display, the third electronic device configured to:
receive the notification data from the event management server; and
render one or more notifications within a third graphical user interface upon the third display, the one or more notifications established in dependence upon the received notification data and each notification relating to a quota for the shift that has not been met or will not be met;
each second electronic device is further configured to automatically authorize communications by a user within the group of users associated with a predetermined role for the shift at the venue for the event when a location of the user is within a predetermined geo-fence of a plurality of geo-fences;
for a first subset of the plurality of geo-fences the communications are unencrypted;
for a second subset of the plurality of geo-fences the communications are encrypted; and
the encryption key for encrypting communications for the second subset of the plurality of geo-fences the communications is established in dependence of the geo-fence of the plurality of geo-fences.

20. A system comprising:
an event management server connected to a network and comprising a memory, the event management server configured to:
generate with the memory a database comprising data relating to a plurality of organizations associated with one or more real world pre-scheduled events (events), the database defining the one or more events, one or more venues associated with the one or more events, one or more shifts within the one or more venues, one or more roles within each shift of the one or more shifts, and one or more users of a plurality of users associated with the event assigned to each one or more shifts and one or more roles;
receive input data from an organizer of an event relating to an organization of the plurality of organizations for storage within the database, the input data transmitted to the event management server via the network from a first electronic device and relating to the definition of the event;
create a plurality of policy chains in dependence upon the input data established by the organizer, each policy chain for defining at least routing for communications by defining a hierarchy comprising an event, a venue, a shift, a role and a group comprising one or more users associated with the role;
create a plurality of quotas, each quota defining the number of users with the group associated with a role for a shift associated with an event at a venue;
transmit via the network one or more requests to a plurality of second electronic devices associated with users assigned to an event and assigned a role, a shift and a venue for the event;
receive from the plurality of second electronic devices via the network a plurality of responses generated in dependence upon the one or more requests;
establish in dependence upon each received response of the plurality of responses whether the user associated with the response is either checked in with respect to the venue and the shift for the event or will be checked in with respect to the venue and the shift for the event by the time the shift begins;

establish whether each quota for the shift at the venue has been or will be met; and where one or more quotas for the shift have not been met or will not be met transmitting notification data to a third electronic device associated with an individual associated with the event as established by a policy chain of the plurality of policy chains associated with the event; wherein the individual is assigned by the event management server in dependence upon a policy chain of the plurality of policy chains associated with the event;

the first electronic device connected to the network associated with the organizer of an event relating to an organization of the plurality of organizations comprising a first user interface and a first display;

the plurality of second electronic devices, each second electronic device of the plurality of second electronic devices connected to the network, comprising a second user interface and a second display, associated with a user of the plurality of users, and executing an event software application for managing communications relating to the one or more pre-scheduled events; and the third electronic device connected to the network associated with the individual comprising a third user interface and a third display each second electronic device is further configured to automatically authorize communications by a user within the group of users associated with a predetermined role for the shift at the venue for the event when a location of the user is within a predetermined geo-fence of a plurality of geo-fences;

for a first subset of the plurality of geo-fences the communications are unencrypted;

for a second subset of the plurality of geo-fences the communications are encrypted; and the encryption key for encrypting communications for the second subset of the plurality of geo-fences the communications is established in dependence of the geo-fence of the plurality of geo-fences.

* * * * *